United States Patent
Chheda et al.

(10) Patent No.: US 7,474,627 B2
(45) Date of Patent: Jan. 6, 2009

(54) VOICE OVER INTERNET PROTOCOL (VOIP) CALL ADMISSION AND CALL REGULATION IN A WIRELESS NETWORK

(75) Inventors: Ashvin H. Chheda, Plano, TX (US); Charles Martin, Van Alstyne, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 951 days.

(21) Appl. No.: 11/015,398

(22) Filed: Dec. 17, 2004

(65) Prior Publication Data

US 2006/0133346 A1    Jun. 22, 2006

(51) Int. Cl.
*H04J 1/16*    (2006.01)
(52) U.S. Cl. .................. 370/252; 370/230; 455/423
(58) Field of Classification Search .......... 370/230, 370/231; 455/423
See application file for complete search history.

(56) References Cited

U.S. PATENT DOCUMENTS

| | | | |
|---|---|---|---|
| 6,700,876 B1 * | 3/2004 | DiNicola et al. ............ 370/252 |
| 6,961,327 B2 * | 11/2005 | Niu ............................. 370/338 |
| 2003/0174700 A1 * | 9/2003 | Ofek et al. ................... 370/389 |
| 2004/0001511 A1 * | 1/2004 | Matta .......................... 370/468 |
| 2004/0219938 A1 * | 11/2004 | Parantainen et al. ........ 455/502 |
| 2004/0264434 A1 * | 12/2004 | Weissberger et al. ........ 370/350 |

* cited by examiner

*Primary Examiner*—Creighton H Smith
(74) *Attorney, Agent, or Firm*—Garlick Harrison & Markison; James A. Harrison

(57) ABSTRACT

A method and apparatus for providing wireless data packet call regulation and call access for wireless Voice over Internet Protocol (VoIP) communications in a wireless network. A first and second time stamp is generated upon the reception and successful transmission of a data packet. A packet delay is determined based upon the first and second time stamps. At least one average delay metric is used to determine whether to provide new call access based on the at least one average delay metric. Another aspect of the present invention is to block a class of users based, in part, on the average sector delay for each user subscriber class. If the average sector delay is greater than that allowed for a class of users, users of that class are denied access. A delay quality of service (QoS) block metric is used to determine if an individual user should be force dropped.

28 Claims, 9 Drawing Sheets

# VOICE OVER INTERNET PROTOCOL (VOIP) CALL ADMISSION AND CALL REGULATION IN A WIRELESS NETWORK

BACKGROUND OF THE INVENTION

1. Technical Field of the Invention

The present invention is related to wireless networks and, more particularly, to call admission and call regulation in a packet data network.

2. Description of Related Art

Traditional wireline networks connected callers over a circuit switched network that created a physical circuit connection between a calling party and a called party over the public switched telephone network (PSTN). Call control, call regulation, and voice quality was maintained by central offices internal to the PSTN.

The Internet was developed as a packet switched network with multiple redundant paths to ensure the delivery of packet data in the event of localized damage to a section of the network. Routers within the Internet periodically updated routing tables to identify the network elements that each router can reach. Each packet may be routed over different paths through the packet switched network then reassembled at the destination. The data contained in the packet is, typically, delay insensitive but requires very high accuracy. Retransmission of packets ensured the reliable transmission of the data.

Voice over Internet Protocol (VoIP) is gaining momentum in the market place today, primarily due to the lower cost associated with the deployment of VoIP networks. VoIP has been mainly focused at the wireline market for some time now. Transmission of voice over the Internet is more tolerant of a degraded accuracy but is less tolerant of packet delay as packet delay has a greater impact on perceived voice quality. The introduction of broad band Internet connection technologies such as DSL and cable modems make VoIP a viable alternative to circuit switched calls.

Recent trends include implementing VoIP on high data rate wireless networks as well. Wireless network scheduling algorithms, delay bound proportional fair for example, are optimized for voice traffic on the wireless network connected to the circuit switched network. When engaged in a VoIP call over a wireless network connected to the packet data network, previous scheduling algorithms may not adequately address the voice quality and delay sensitive needs of VoIP users. In addition, without an appropriate mechanism to regulate the usage, the delay in the system will increase as a function of the load in the system. Consequently, an increase in the delay will detrimentally affect every active VoIP user in the system. What is needed, therefore is a call admission and call control method and apparatus to substantially meet the needs of VoIP wireless networks.

BRIEF SUMMARY OF THE INVENTION

A method and an apparatus of the present invention solves the forgoing problems using a call admission and call regulation algorithm and apparatus to maintain acceptable quality of service (QoS) levels. As the number of new users attempt to access the wireless network, the practical limit to a wireless sector or wireless cell may be reached for a given grade of service (GOS). Allowing additional users access to the system increases the packet error rate (PER) and the packet drop rate from excessive delay, thus lowering the mean opinion score which is a measure of perceived voice quality. If all or a subset of users share a high-speed packet data channel, an increase in the number of users in the network increases the length of time individual data packets are waiting in a data packet buffer. A method and apparatus of the present invention determines the delay time of each data packet then filters the delay time to produce an average sector delay that may be used to block access to the network if the average sector delay is greater than a defined threshold.

A method for providing wireless data packet access for wireless VoIP communications in a network element of a wireless network comprises generating a first time stamp upon the reception of a data packet if the data packet did not include the first time stamp. The received data packet is transmitted and a second time stamp is generated upon reception of an acknowledgement (ACK) from the mobile terminal if the ACK does not include the second time stamp. A packet delay is determined based upon the first and second time stamps. Alternatively, a "pseudo" packet delay may have a start time based on the time of arrival at the sector scheduler. The delay packet delay at any instant in time is then based on the difference between the current time at which the packet is still waiting in the scheduler and the time of arrival at the scheduler. The packet delay is produced to at least one filter to produce at least one average delay metric that is then used to determine whether to provide new call access based on the at least one average delay metric. Another aspect of the present invention is to block a class of users based, in part, on the average sector delay for each user subscriber class. If the average sector delay is greater than that allowed for a class of users, users of that class are denied access.

The method further produces a delay QoS block metric based, in part, on the individual delay metrics to determine if an individual user should be force dropped. In this scenario, the individual delay is so bad that the user has no viable voice quality. Force dropping the individual user frees up scarce network resources.

A call admission and control (CAC) function in a network element produces and regulates the call admission algorithm. The CAC function may reside anywhere in the network owned by the network operator. In one embodiment, an access point performs the call admission and call control in the wireless network. The access point includes transceiver circuitry for receiving and for transmitting data packets that include data messages and signaling messages, at least one buffer for storing received data packets that carry data messages that can not be transmitted immediately, and at least one buffer for storing received data packets that carry signaling messages that can not be transmitted immediately. Time stamp logic within the access point generates time stamps and for calculating a delay between the reception of a data packet and an acknowledgement of the data packet. At least one filter produces a plurality of average delay metrics used to administer the call admission and call regulation policy.

The above-referenced description of the summary of the invention captures some, but not all, of the various aspects of the present invention. The claims are directed to some of the various other embodiments of the subject matter towards which the present invention is directed. In addition, other aspects, advantages, and novel features of the invention will become apparent from the following detailed description of the invention when considered in conjunction with the accompanying drawings.

DETAILED DESCRIPTION OF THE INVENTION

Figure 1:
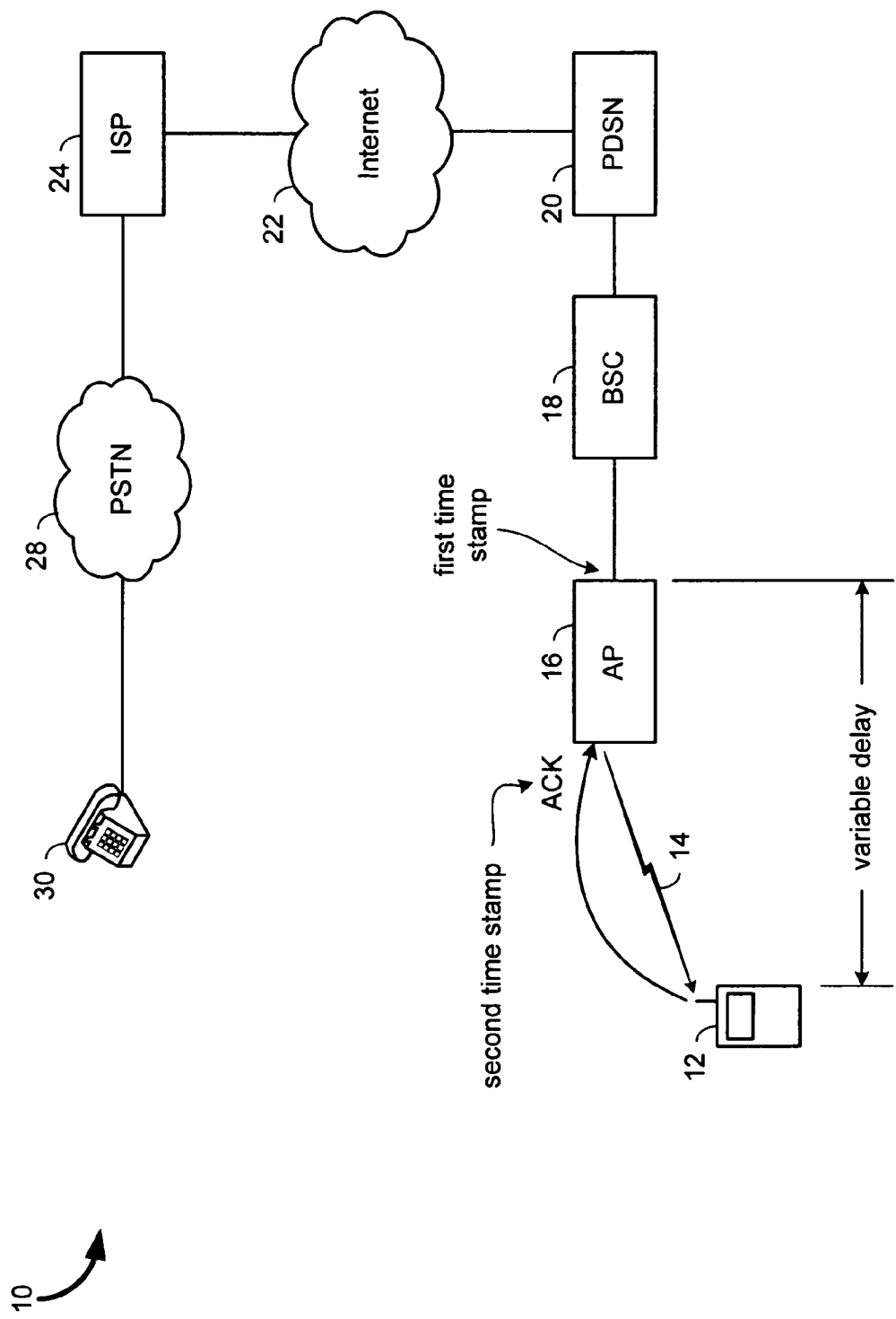
FIG. 1 is a communications network formed according to one embodiment of the present invention.

These and other features, aspects and advantages of the present invention will be more fully understood when considered with respect to the following detailed description, appended claims and accompanying drawings wherein:

FIG. 1 is a communications network formed according to one embodiment of the present invention. In the communications network shown generally at 10, mobile terminal 12 is engaged in a voice over Internet Protocol (VoIP) call with a landline 30 through a wireless interface to the packet data network. Communications network 10 includes an access point (AP) 16, a base station controller (BSC) 18, a pack data serving node (PDSN) 20, Internet 22, and Internet service provider (ISP) 24, public switched telephone network (PSTN) 28, and landline 30.

One aspect of the present invention is to control mobile terminal access to communications network 10 and mobile terminal control while connected to communications network 10. Traditional packet data applications, e-mail for example, are insensitive to packet delay but require high accuracy. Packetized voice communications, however, are very sensitive to delay but can tolerate a certain amount of an inaccuracy without noticeable loss of voice quality.

One source of delay in a wireless network is due to the queuing of data packets in a scheduler as more mobile terminals attempt to access the system. Since each mobile terminal shares the same forward link packet data channel, data packets are queued by the scheduler until they can be transmitted. For a small number of mobile terminals connected to the system, the queue time is small. However, as more mobile terminals connect to the network the queue time increases and thus represents a delay. The method and the apparatus of the present invention measures the delay of each data packet, filters the delay to produce an average delayed metric and controls access to the network based on a plurality of delay thresholds.

As shown in FIG. 1, a series of time stamps are used to measure the time of entry into AP 16 (the first time stamp) and to measure the acknowledgment (ACK) of the packet delivery (the second time stamp). The difference between the first time stamp and the second time stamp is the measured delay. In the example of FIG. 1, it is assumed that the scheduler resides in AP 16 and that the first time stamp is generated upon the arrival of a data packet into AP 16. The second time stamp is generated when mobile terminal 12 responds to the successful delivery of the data packet over forward data packet channel 14 with an ACK to AP 16. It is worth noting that the first and second time stamps may be generated at the first point of entry of the data packet into the network operator's domain, BSC 18 or PDSN 20, for example.

Another aspect of the present invention is to control call access according to a subscriber class of users wherein a subclass of users are granted access, denied access, or forced dropped from the wireless network according to an average delayed metric of the subclass.

Another problem solved by the present invention is that of the scheduler packet drop rate. Data packets may be dropped for two reasons: firstly, the data packet is dropped because it was unsuccessfully delivered due to bad channel conditions and secondly, packets are dropped by the scheduler because they have been in the packet data buffer for an excessive length of time and thus would be useless to the mobile terminal. A delay bound metric is specified such that new call access is blocked if the average delay metric is greater than the delay bound metric. The delay bound metric is increased or decreased if the packet drop rate is greater than or less than a specified percentage for a specified period of time. This specified time function provides a small amount of hysteresis which prevents excessive adjustment to the delay bound metric.

Figure 2:
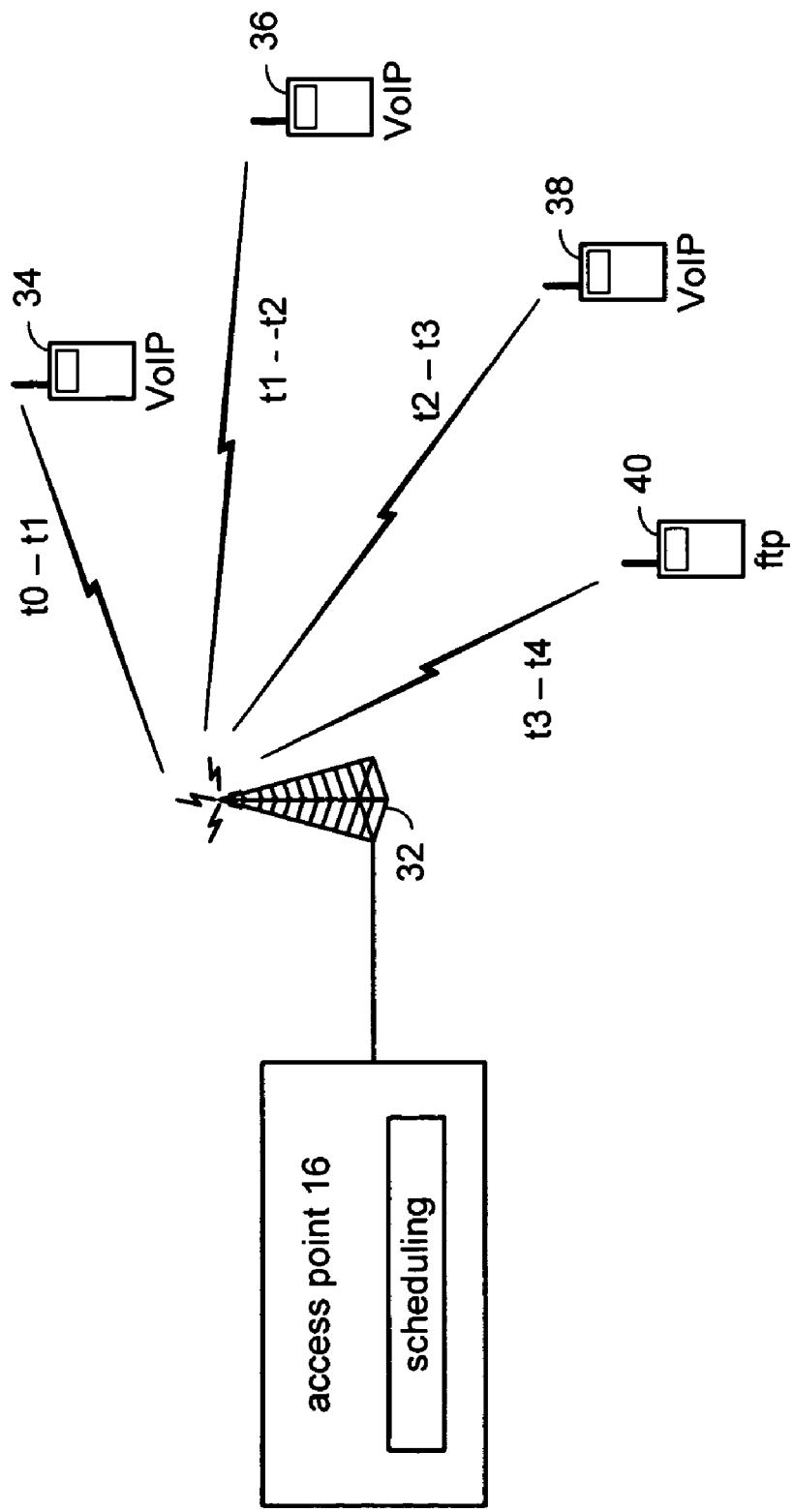
FIG. 2 is a schematic block diagram of a call admission policy in a high-speed data packet network.

FIG. 2 is a schematic block diagram of a call admission policy in a high-speed data packet network. As can be seen, the high-speed data packet network includes AP 16, base transceiver subsystem (BTS) 32, VoIP terminals 34-38, and file transport protocol (FTP) terminal 40. Each of the data terminals in FIG. 2 shares a sector forward link data packet channel during transmission time slots assigned by the scheduling function of AP 16. Data packets are transmitted by AP 16 to VoIP terminal 34 during time slot t0-t1, VoIP terminal 36 during time slot t1-t2, VoIP terminal 38 during time slot t2-t3, and to FTP terminal 40 during time slot t3-t4. With only four data terminals in the high-speed data packet network the data packets are transferred fast enough so that there is minimal to negligible queuing time of user packets by the scheduling function of AP 16. However, as the number of data terminals in the high-speed data packet network increases, data packets may experience a longer queue time for transmission by the scheduling function of AP 16. As the waiting time in the data packet buffer increases, the average delay metric of that high-speed data packet network sector will also increase. As the data packet delay average increases in the sector, the perception of voice quality as measured by a mean opinion score (MOS) decreases. As the voice quality decreases it becomes necessary to control access to the high-speed data packet network sector to maintain acceptable voice quality for users already connected to the sector and system as a whole.

The present invention generates time stamps for calculating the delay between the reception of a data packet and an acknowledgement of a successful transmission of the data packet. A plurality of filters, including one of an infinite impulse response (IIR) filter or a finite impulse response (FIR) filter, averages the sector delays to produce a plurality of average delay metrics. The present invention compares the plurality of average delay metrics to statistical averages and blocks all mobile terminal access if a sector average delay metric is above a first threshold. If the sector average delay metric is between the first threshold and a second threshold, the method of the present invention grants access to new mobile terminals of a third subscriber class. If the sector average delay metric is below the second threshold, the present invention grants access to new mobile terminals of a third subscriber class and the second subscriber class. If the sector average delay metric is below the third threshold, then all new mobile terminals are granted access.

The first, second, and third subscriber classes are typically assigned various levels of delay, wherein the first subscriber class requires a lower level of delay than either the second subscriber class or the third subscriber class. The third subscriber class is the most tolerant to delay and thus has a higher delay value.

Under heavily loaded conditions, it may be necessary to force drop connected users who are experiencing excessive individual delay averages. The present invention may force drop a mobile terminal if an individual average delay value is more than a sector delay QoS level. In this scenario, the individual mobile terminal is experiencing high levels of delay, and conversely a low voice quality, but is consuming scarce network resources. The method and apparatus of the present invention will force drop this mobile terminal to preserve QoS for mobile terminals in the sector.

Figure 3:
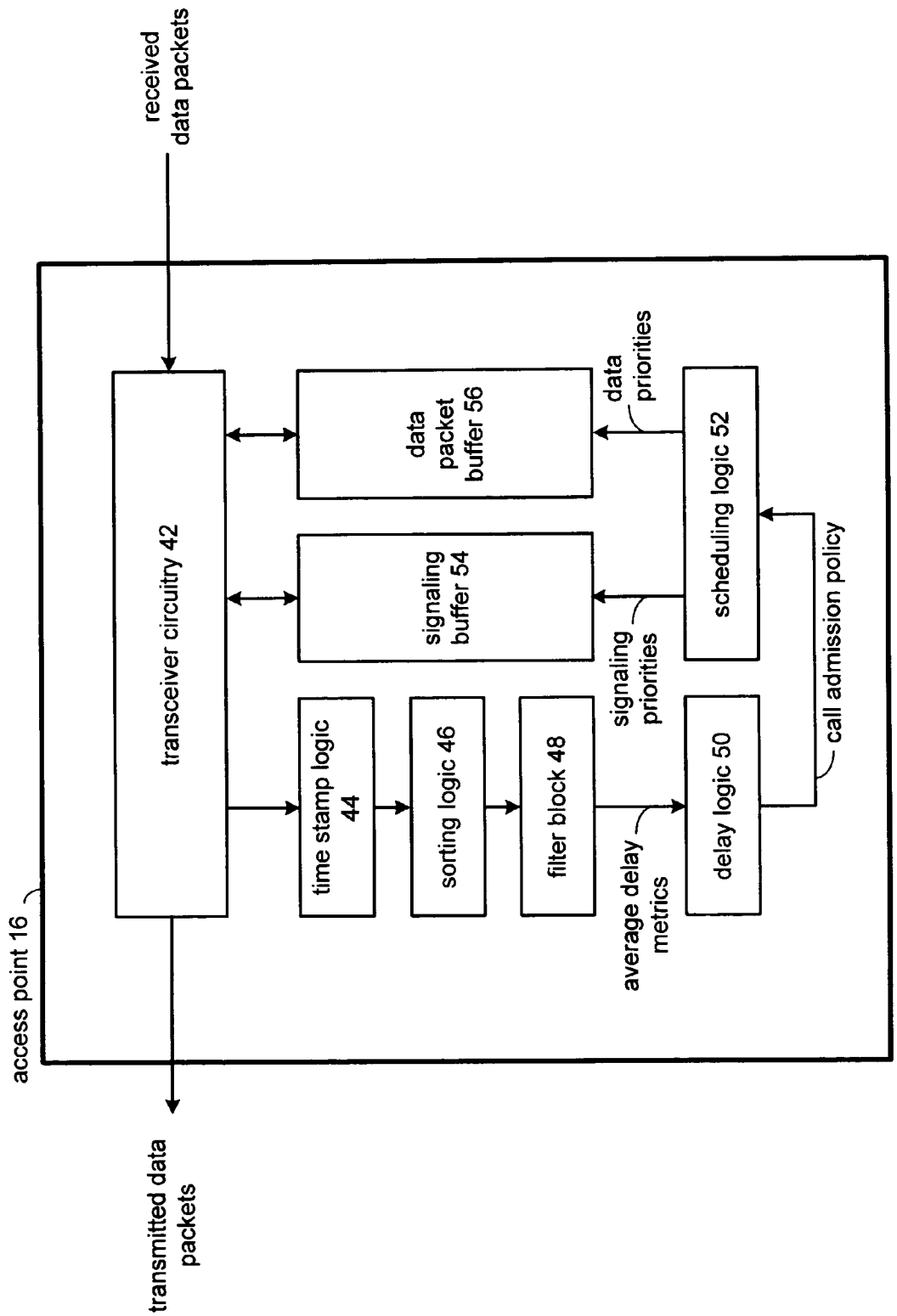
FIG. 3 is a schematic block diagram of an access point for performing call admission and call control in a wireless network.

FIG. 3 is a schematic block diagram of an access point for performing call admission and call control in the wireless network. AP 16 includes transceiver circuitry 42, time stamp logic 44, sorting logic 46, filter block 48, delay logic 50, scheduling logic 52, signaling buffer 54, and data packet buffer 56. Transceiver circuitry 42 receives and transmits data packets that include data messages and signaling messages. As previously discussed, received data packets may be temporarily stored until they are ready for transmission. Signaling buffer 54 stores data packets that carry signaling messages that can not be transmitted immediately, while data packet buffer 56 stores data packets that carry data messages that can not be transmitted immediately. Time stamp logic 44 generates time stamps and calculates a delay between the reception of a data packet at the access point and an acknowledgement of a successful transmission of the data packet which is feedback from the access terminal to the access point on the control ACK_NAK channel. Sorting logic 46 routes the calculated delay to filter block 48 based on at least one of a subscriber class level, a sector number, and a mobile terminal ID.

A plurality of filters in filter block 48 produces a plurality of average delay metrics, including average delay per sector, as well as individual delay metrics for each mobile terminal serviced by AP 16. The plurality of filters includes at least one of an IIR filter and a FIR filter. Delay logic 50 generates a call admission policy based on the average delay metrics. Scheduling logic 52 produces signaling priorities and data priorities for prioritizing the buffered data packets based on a subscriber class of service. For example, signaling messages are typically delay intolerant and are assigned a higher priority than data messages. The assigned data priority may be based on a subscribed level of delay wherein a first subscriber class pays for a lower delay to ensure rapid transmission of data.

Figure 4:
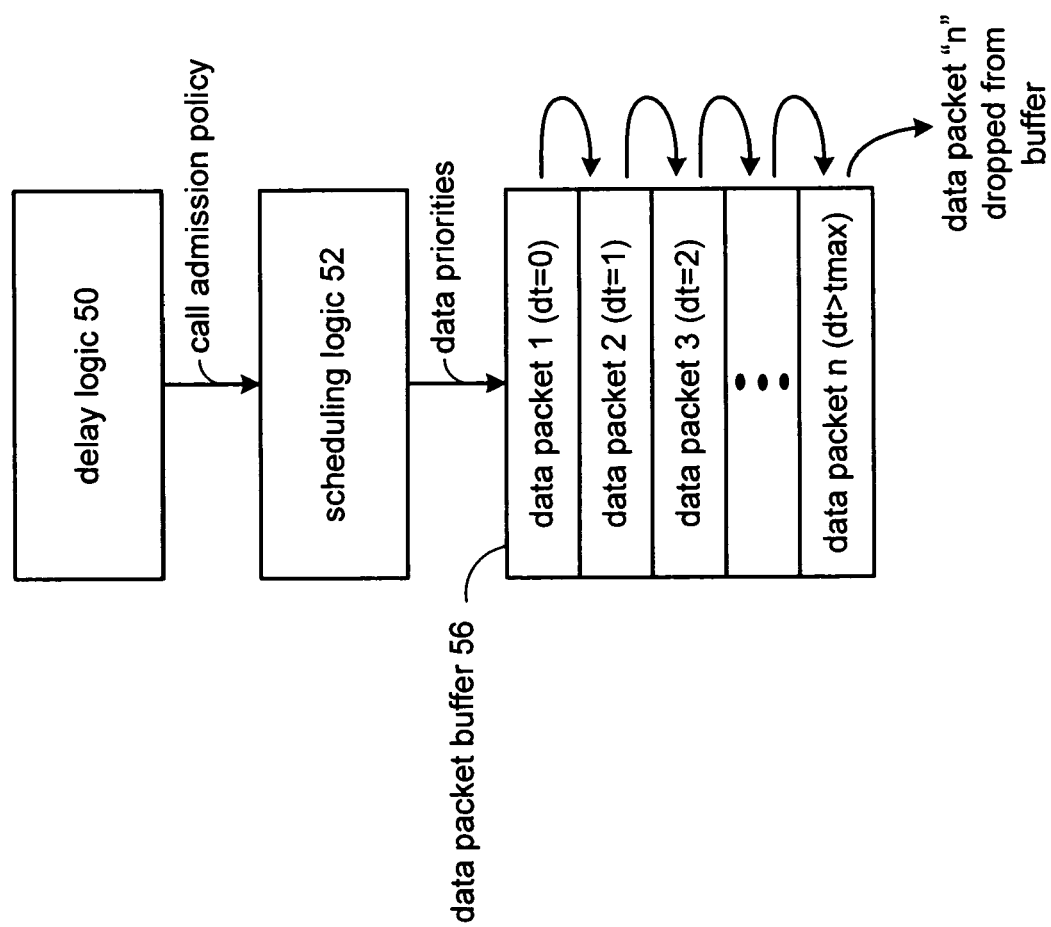
FIG. 4 is a functional block diagram illustrating a packet drop rate in a network element.

FIG. 4 is a functional block diagram illustrating a packet drop rate in a network element. In the example of FIG. 4, the network element is typical of access point 16 of FIG. 3 wherein delay logic 50 and scheduling logic 52 determine a call admission policy and set data priorities, respectively, for mobile terminals controlled by the network element. One aspect of the present invention is to adjust a delay bound metric in the system to a point where mobile terminals that are not blocked will only suffer a packet drop rate between a first and second percentage to ensure good speech quality.

If the average delay in a sector is high due to a bad channel or a mobile terminal experiencing a fade, the scheduling function of the network element will drop a packet when the delay is such that it would be useless to transmit the data packet. As illustrated in FIG. 4, data packet buffer 56 has stored a plurality of data packets for transmission to mobile terminals connected to the network as soon as the shared forward link packet data channel is available. Data packet N stored in data packet buffer 56 has experienced a delay of delta-T (dt) that is greater than a defined time t-Max and, accordingly, scheduling logic 52 drops the data packet from the data packet buffer.

When a data packet is dropped from the data packet buffer, previously stored data packets will move down sequentially in the buffer in order to store newly received data packets. As each data packet is dropped from the data packet buffer, the packet drop rate increases. If the active users in the network experience a packet drop rate greater than a pre-configured first percentage over a specified period of time, the delay bound is decreased by a first factor in order to block access to the system. If, however, the active users in the network experience a drop rate less than a reconfigured second percentage (where the second percentage is less than the first percentage) then the scheduling logic increases the delay bound by a second factor so that fewer calls are blocked.

Figure 5:
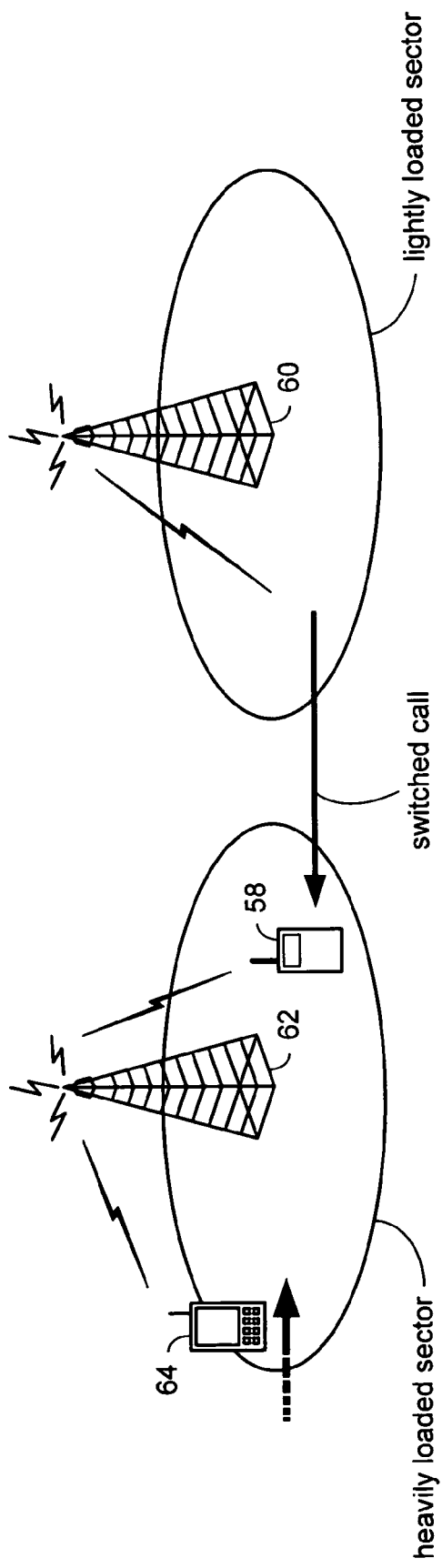
FIG. 5 is a schematic block diagram of cell site switching according to an embodiment of the present invention.

FIG. 5 is a schematic block diagram of cell site switching according to an embodiment of the present invention. The present invention provides a plurality of filter delay metrics for each sector in a communication network. To allow for mobile terminal mobility, filtered delayed metrics for a switched call will be different from the filtered delay metrics for a new call. It is desirable to block access to new calls when the average sector delay exceeds a defined threshold value.

Once a mobile terminal has access to the network, however, the connection should be maintained even when the mobile terminal switches sectors or cells within the network. Stated differently, the present invention produces a switched call block metric that is less stringent than a new call block metric. As illustrated in FIG. 5, mobile terminal 58 is moving from a lightly loaded sector served by BTS 60 to a more heavily loaded sector served by BTS 62. It is desirable to maintain the switched call connection to mobile terminal 58 as it enters the heavily loaded sector even though a new connection to mobile terminal 64 may be blocked because the average sector delay is greater than a specified threshold for new calls.

Figures 6, 7:
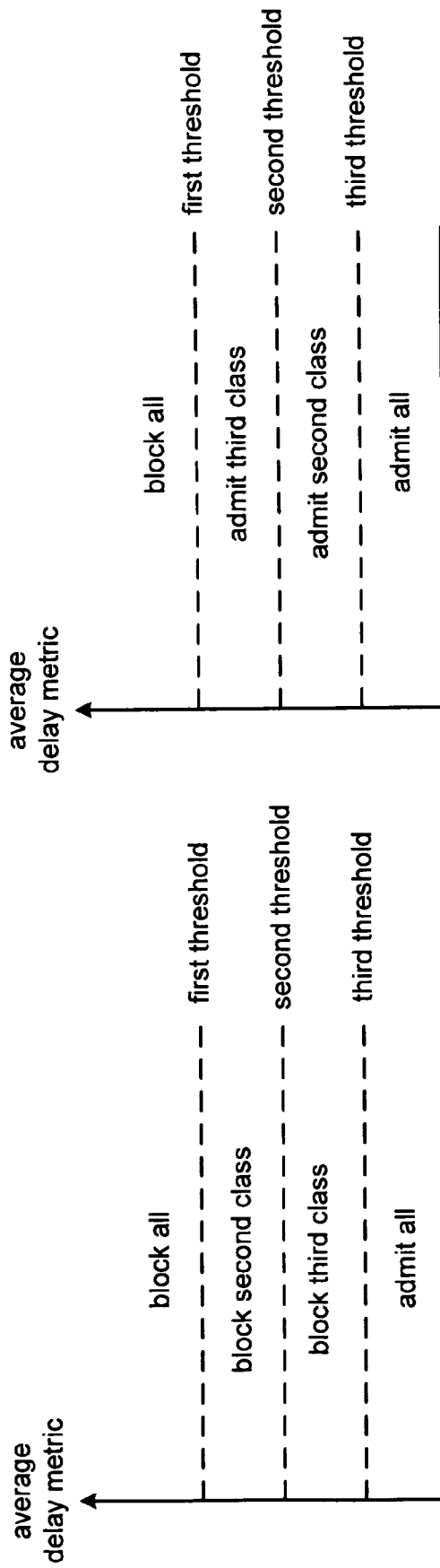
FIG. 6 is a graph illustrating method for providing new call access according to an embodiment of the present invention.
FIG. 7 is a graph illustrating a method for providing new call access according to an alternate embodiment of the present invention.

FIG. 6 is a graph illustrating a method for providing new call access according to an embodiment of the present invention. The method of FIG. 6 ensures a maximum number of first class users access to the network. As can be seen in FIG. 6, a first, second, and third threshold are defined according to a desired average delay metric. Based on the level of the average delay metric, subscriber classes of users are granted access or blocked access to the network. For example, all new mobile terminal access is blocked if the average delay metric is greater than a first threshold. If the average delay metric is below the first threshold but above the second threshold, then second class subscribers are blocked from new access.

Similarly, access is blocked for second class and third class subscribers if the average delay metric is below the second threshold and above a third threshold. All new access is granted if the average delay metric is below the third threshold. By restricting access to second and third class subscribers, a maximum number of first class subscribers are allowed access to the network.

FIG. 7 is a graph illustrating a method for providing new call access according to an alternate embodiment of the present invention. The method of FIG. 7 ensures a maximum total number of class users are allowed access to the network. As can be seen in FIG. 7, a first, second, and third threshold are defined according to a desired average delay metric. Based on the level of the average delay metric, subscriber classes of users are granted access or blocked access to the network.

For example, all new mobile terminal access is blocked if the average delay metric is greater than a first threshold. If the average delay metric is below the first threshold but above the second threshold, then only third class subscribers are given new access. Similarly, access is granted for third class and second class subscribers if the average delay metric is below the second threshold and above the third threshold. All new access is granted if the average delay metric is below the third threshold. By granting access to second and third class subscribers before first class subscribers, a maximum number of total subscribers are allowed access to the network.

Figure 8:
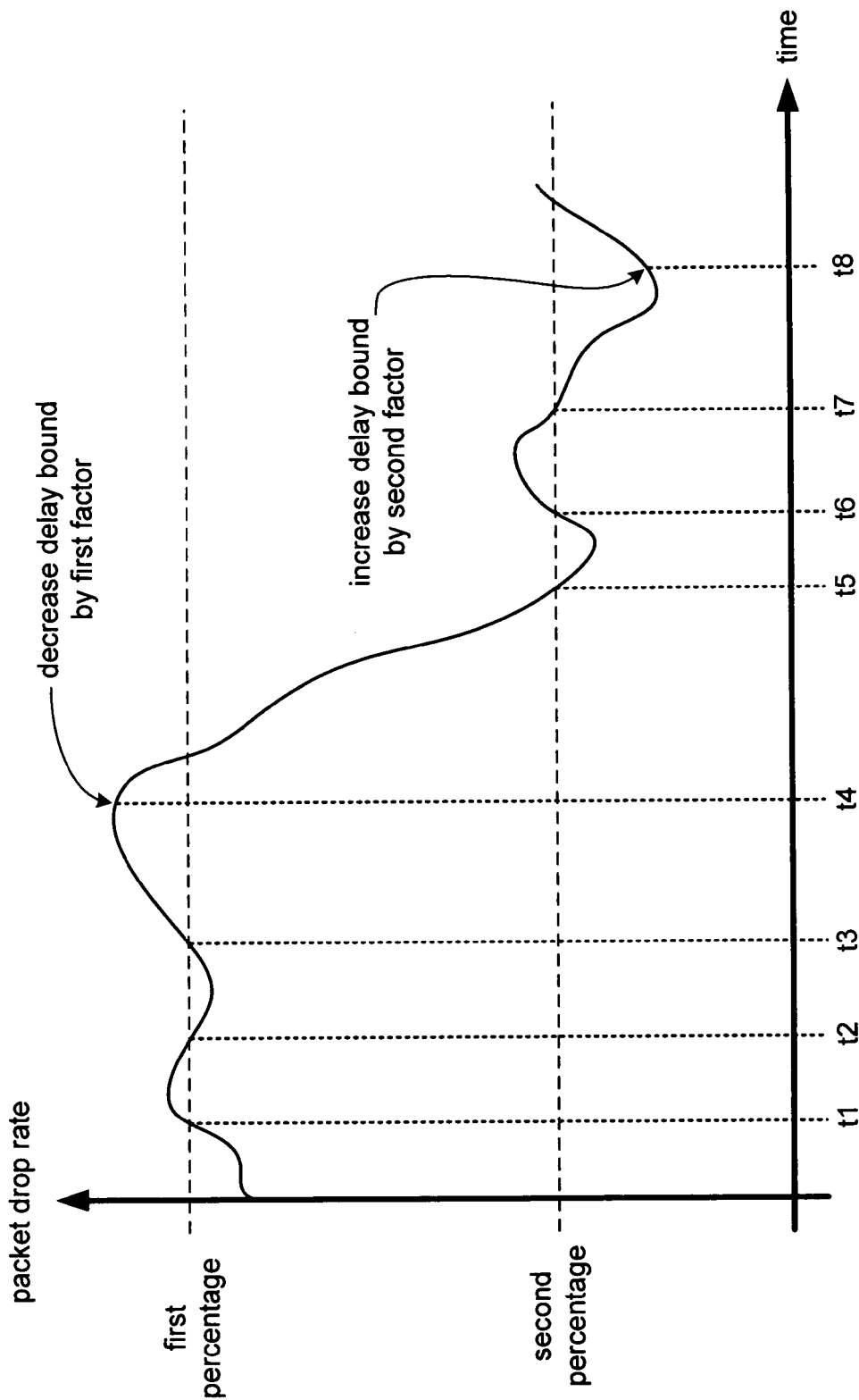
FIG. 8 is a graph illustrating adjustment of a delay bound block in accordance with the present invention.

FIG. 8 is a graph illustrating adjustment of a delay bound in accordance with the present invention. For active users, data packets that stay in the data packet buffer beyond a certain amount of time will be dropped, as they will be useless when received. This will negatively affect speech quality. The method of the present invention provides a feedback mechanism to block a new mobile terminal if the delay average is greater than the delay bound. Additionally, the delay bound is adjusted if the packet drop rate exceeds specified limits for a specified period of time.

The inclusion of the time period introduces some hysteresis into the feedback loop to prevent the system from constantly changing the delay bound. For example, in FIG. 7 the sector short term average packet drop rate exceeds the first percentage from time t1 to time t2, which is less than a specified period of time, so the delay bound is not adjusted. However, the sector short term average packet drop rate exceeds the first percentage for a time period from t3 to t4 that is greater than the specified percentage so the delay bound in the sector is decreased by the first factor. This allows for more stringent call admission in the sector, which would relieve the VoIP load in the sector, thereby decreasing the average delay experienced by packets in the sector. This results in improved voice quality for the active users on the call.

Similarly, the delay bound will be increased if the short term average packet drop rate in the sector drops below a second percentage for the specified period of time. The short term average packet drop in the sector rate drops below the second percentage during time t5 to t6, which is less than the specified time period, so the sector delay bound is not adjusted. However, the short term average packet drop rate in the sector is less than the second percentage for a time period from t7 to t8 that is greater than the specified percentage so the sector delay bound is increased by the second factor.

The adjustment of the sector delay bound keeps the delay block in the system to a point where the users that are not blocked will only suffer a drop rate between the first and second percentage for good speech quality. These dynamic thresholds and control mechanisms are run independently by each sector. That is, each sector is in control of its own load management, and at any one times the delay thresholds used by different sectors may not be the same.

Figure 9:
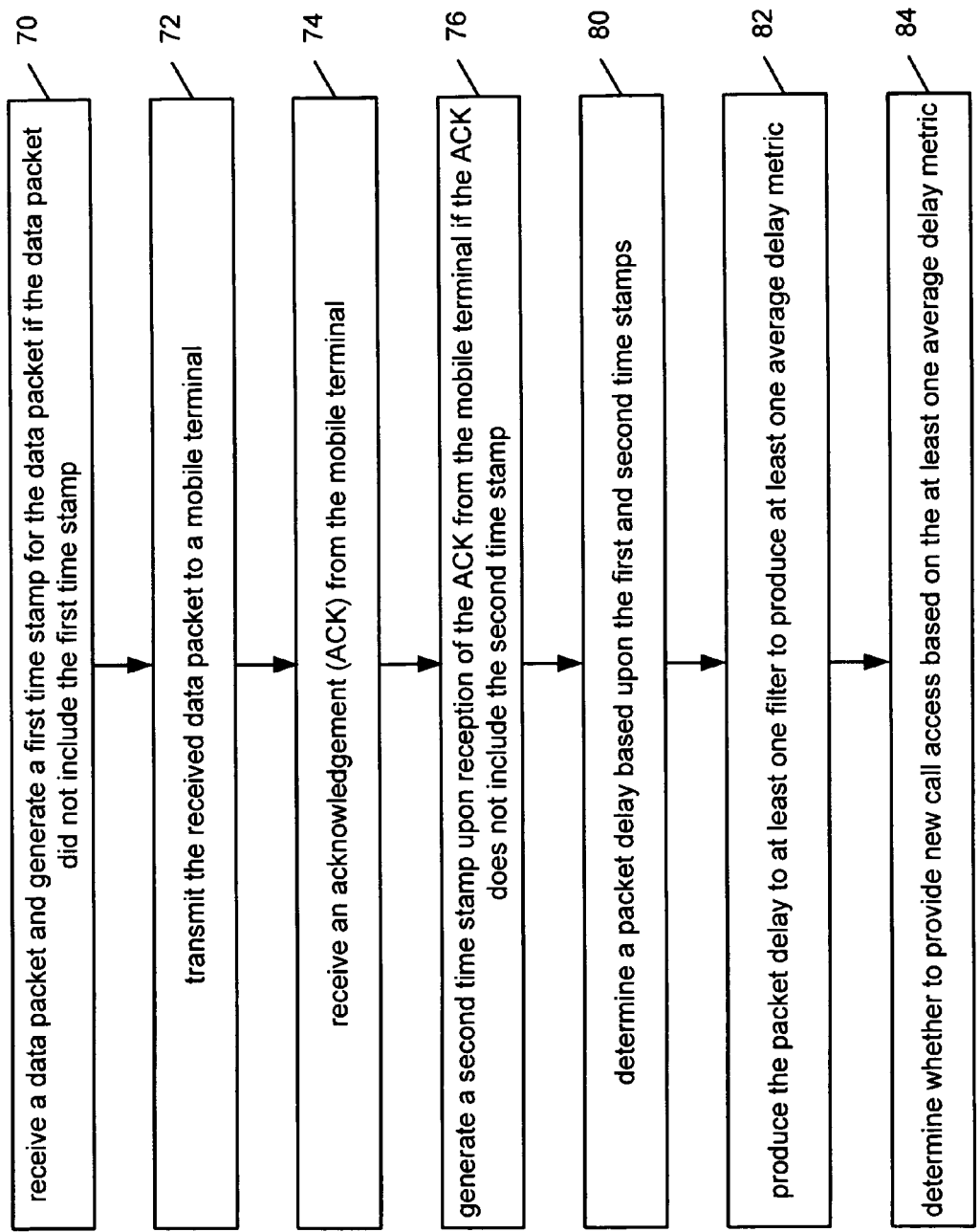
FIG. 9 is a flow chart of a method for providing wireless data packet access for wireless VoIP communications in a network element of a wireless network.

FIG. 9 is a flow chart of a method for providing wireless data packet access for wireless VoIP communications in a network element of a wireless network. The network element, typically a scheduling function in a wireless access point, receives a data packet and generates a first time stamp for the data packet if the data packet did not include the first time stamp (step 70). The network element transmits the received data packet to a mobile terminal (step 72) and then receives an acknowledgement (ACK) from the mobile terminal (step 74). The network element generates a second time stamp upon reception of the ACK from the mobile terminal if the ACK does not include the second time stamp (step 76).

Thereafter, the network element determines a packet delay based upon the first and second time stamps (step 80). The packet delay may be the result of a heavily loaded sector or may be due to a large number of subscribers having a higher priority level. Under these conditions, the data packet may be left in the data packet buffer until the shared forward data packet channel is available. The network element produces the packet delay to at least one filter to produce at least one average delay metric (step 82). The at least one filter includes a filter that produces an average delay period for all communications, and further includes a plurality of filters, at least one of which produces an average delay for communications for the mobile stations of at least one of a first, a second class, and a third class of subscribers. As previously discussed, mobile terminals may subscribe to a class of service that is based, in part, on a desired QoS level.

Thereafter, the network element determines whether to provide new call access based on the at least one average delay metric (step 84). Determining whether to provide new call access to a wireless communication link is based partially upon an average delay metric per mobile terminal determined from an average delay per sector and a number of mobile terminals per sector. The new call access may be blocked if an increase in the average delay per sector due to the new call access is greater than a delay bound. It should also be noted that the time stamps can be done differently. The initial time stamp can be done when the packet reaches the access point, while the time the packet is waiting in the buffer is used to generate a constantly updating second time stamp. This way, a packet that has been in the buffer for a sufficient time, where it would be pointless to transmit, can be discarded without attempting to transmit it and waiting for an ACK. This frees up valuable resources. The average sector delay is then computed periodically by determining the average time each packet of each user in that sector has been waiting in the scheduler buffers.

Determining whether to provide new access also includes blocking all new mobile terminals access if the at least one average delay metric is above a first threshold, blocking access to new mobile terminals of a second class if the at least one average delay metric is above the first threshold and below a second threshold, and blocking access to new mobile terminals of the second class and a third class if the at least one average delay metric is below the second threshold and above a third threshold. Access is granted to all new mobile terminals if the at least one average delay metric is below the third threshold.

In an alternate embodiment, determining whether to provide new call access includes blocking all new mobile terminals access if an average sector delay metric is above a first threshold, granting access to new mobile terminals of a third class if the average delay metric is below the first threshold and above a second threshold, and granting access to new mobile terminals of the third class and a second class if the average delay metric is below the second threshold and above a third threshold. Access is granted to all new mobile terminals if the average delay metric is below the third threshold.

Another aspect of the present invention is to determine a total delay through the packet data network to establish a total delay budget. The total delay experienced by a VoIP call is based, in part, on the variable delay through the network operator owned equipment plus a substantially fixed delay through the external packet data network, i.e., the Internet.

One way to determine the substantially fixed delay through the external packet data network is to generate a protocol utility command to one of a call source or a call destination and timing a round trip time delay from the network element. For example, in TCP/IP, a ping command or a trace route command will provide an estimate of the round trip delay from the source to the destination. The network element calculates the delay budget for determining a plurality of thresholds used for call admission wherein the delay budget is determined by subtracting at least a portion of the round trip time delay as well as fixed delay values along a communication link from a total acceptable amount of delay.

Figure 10:
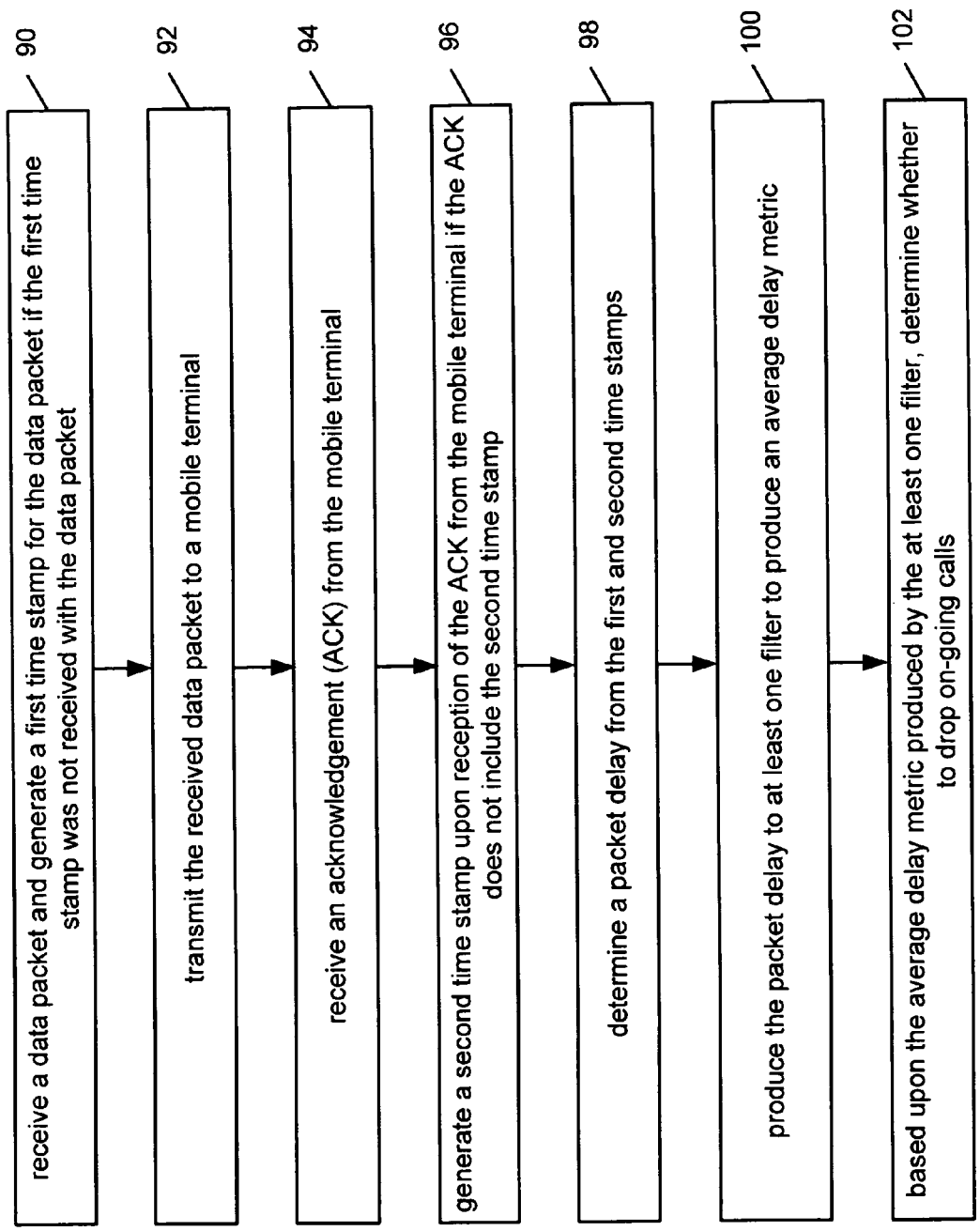
FIG. 10 is a flow chart for a method for providing wireless data packet access for wireless VoIP communications in a network element of a wireless network.

FIG. 10 is a flow chart for a method for providing wireless data packet access for wireless VoIP communications in a network element of a wireless network. The network element receives a data packet and generates a first time stamp for the data packet if the first time stamp was not received with the data packet (step 90). Then the network element transmits the received data packet to a mobile terminal (step 92). After a successful transmission of the data packet, the network element receives an acknowledgement (ACK) from the mobile terminal (step 94) then generates a second time stamp upon reception of the ACK from the mobile terminal if the ACK does not include the second time stamp (step 96). The network element then determines a packet delay from the first and second time stamps (step 98). Thereafter, the network element produces the packet delay to at least one filter to produce an average delay metric (step 100). Lastly, based upon the average delay metric produced by the at least one filter, the method determines whether to drop on-going calls (step 102). In some network environments a mobile terminal may experience an average call delay such that the voice quality falls below useable levels. In this case the mobile terminal is consuming network resources that affect the other mobile terminals in the network. Therefore, the network element further determines, for a mobile node having an individual average call delay, dropping the mobile node if the individual average call delay is greater than a delay QoS drop level wherein the delay QoS drop level is one that substantially exceeds the average delay values. Another aspect of the present invention includes dropping calls based upon at least one of a plurality of factors, including call duration, call type and class of service assigned to the mobile terminals engaged in calls wherein calls are dropped in an order from a lowest class to a highest class.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for providing wireless data packet access for wireless Voice over Internet Protocol (VoIP) communications in a network element of a wireless network, the method comprising:
   receiving a data packet and generating a first time stamp for the data packet if the data packet did not include the first time stamp;
   transmitting the received data packet to a mobile terminal;
   receiving an acknowledgement (ACK) from the mobile terminal;
   generating a second time stamp upon reception of the ACK from the mobile terminal if the ACK does not include the second time stamp;
   determining a packet delay based upon the first and second time stamps;
   producing the packet delay to at least one filter to produce at least one average delay metric; and
   determining whether to provide new call access based on the at least one average delay metric.

2. The method of claim 1 wherein determining whether to provide new call access comprises:
   blocking all new mobile terminals access if the at least one average delay metric is above a first threshold;
   blocking access to new mobile terminals of a second class if the at least one average delay metric is below the first threshold and above a second threshold;
   blocking access to new mobile terminals of the second class and a third class if the at least one average delay metric is below the second threshold and above a third threshold; and
   granting all new mobile terminals access if the at least one average delay metric is below the third threshold.

3. The method of claim 1 wherein determining whether to provide new call access comprises:
   blocking all new mobile terminals access if an average sector delay metric is above a first threshold;
   granting access to new mobile terminals of a third class if the average sector delay metric is below the first threshold and above a second threshold;
   granting access to new mobile terminals of the third class and a second class if the average sector delay metric is below the second threshold and above a third threshold; and
   granting all new mobile terminals access if the average sector delay metric is below the third threshold.

4. The method of claim 1 wherein the at least one filter includes a filter that produces an average delay period for all communications.

5. The method of claim 4 wherein the at least one filter comprises a plurality of filters, at least one of which produces an average delay for communications for the mobile stations of at least one of the first, second and third classes.

6. The method of claim 1 wherein determining the packet delay further comprises:

generating a protocol utility command to one of a call source or a call destination and timing a round trip time delay from the network element.

7. The method of claim 6 wherein the network element calculates a delay budget for determining a plurality of thresholds used for call admission wherein the delay budget is determined by subtracting at least a portion of the round trip time delay as well as fixed delay values along a communication link from a total acceptable amount of delay.

8. The method of claim 1 wherein the network element receives communications with at least one time stamp value reflecting a time the data packet was originated and wherein the network element determines a delay to a destination device to calculate a total delay.

9. The method of claim 8 wherein the total delay is produced to a filter that averages total delay values for a plurality of communications to produce an average delay value that is used for comparison to at least one threshold to determine call admission.

10. The method of claim 9 wherein the step of comparing to the at least one threshold to determine call admission further comprises:
comparing the average delay value to a delay bound metric;
blocking call admission if the comparison is unfavorable; and
allowing call admission if the comparison is favorable.

11. The method of claim 10 wherein the comparing the average delay value to the delay bound metric further comprises:
decreasing the delay bound metric by a first factor if a network packet drop rate is greater than a specified first percentage;
increasing the delay bound metric by a second factor if the network packet drop rate is less than a specified second percentage; and
wherein the specified second percentage is less than the specified first percentage.

12. The method of claim 1 wherein the step of determining whether to provide new call access to a wireless communication link is based partially upon delays experienced by a communication signal in an external landline network.

13. The method of claim 1 wherein the step of determining whether to provide new call access to a wireless communication link is based partially upon:
an average delay metric per mobile terminal determined from an average delay per sector and a number of mobile terminals per sector, and
wherein the new call access may be blocked if an increase in the average delay per sector due to the new call access is greater than a delay bound.

14. A method for providing wireless data packet access for wireless Voice over Internet Protocol (VoIP) communications in a network element of a wireless network, the method comprising:
receiving a data packet and generating a first time stamp for the data packet if the first time stamp was not received with the data packet;
transmitting the received data packet to a mobile terminal;
receiving an acknowledgement (ACK) from the mobile terminal;
generating a second time stamp upon reception of the ACK from the mobile terminal if the ACK does not include the second time stamp;
determining a packet delay from the first and second time stamps;
producing the packet delay to at least one filter to produce an average delay metric; and based upon the average delay metric produced by the at least one filter, determining whether to drop on-going calls.

15. The method of claim 14 further including determining, for a mobile terminal having an individual average call delay, dropping the mobile terminal if the individual average call delay is greater than a delay QoS drop level wherein the delay QoS drop level is one that substantially exceeds average delay values.

16. The method of claim 14 further including dropping calls based upon at least one of a plurality of factors including call duration, call type and class of service assigned to the mobile terminals engaged in calls.

17. The method of claim 16 wherein calls are dropped in an order from a lowest class to a highest class.

18. An access point for performing call admission and call control in a wireless network, comprising:
transceiver circuitry for receiving and for transmitting data packets that include data messages and signaling messages;
at least one buffer for storing received data packets that carry data messages that can not be transmitted immediately;
at least one buffer for storing received data packets that carry signaling messages that can not be transmitted immediately;
time stamp logic for generating time stamps and for calculating a delay between the reception of a data packet and an acknowledgement of the data packet;
at least one filter for producing a plurality of average delay metrics;
sorting logic for routing the calculated delay to the at least one filter of a plurality of filters;
delay logic for generating a call admission policy based on the plurality of average delay metrics; and
scheduling logic for prioritizing the buffered data packets based on a subscriber class of service.

19. The access point of claim 18 wherein the scheduling logic prioritizes the buffered data packets based upon whether the data packets carry data messages or signaling messages, and if appropriate, the criticality of the signaling messages.

20. The access point of claim 18 wherein the call admission policy:
blocks all new mobile terminals access if the plurality of average delay metrics is above a first threshold;
grants access to new mobile terminals of a third subscriber class if the plurality of average delay metrics is below the first threshold and above a second threshold;
grants access to new mobile terminals of the third subscriber class and a second subscriber class if the plurality of average delay metrics is below the second threshold and above a third threshold; and
grants all new mobile terminals access if the plurality of average delay metrics is below the third threshold.

21. The access point of claim 18 wherein the at least one filter comprises one of an infinite impulse response (IIR) filter or a finite impulse response (FIR) filter.

22. The access point of claim 18 wherein the at least one filter comprises a plurality of filters and wherein the sorting logic routes the calculated delay to one of the plurality of filters based on at least one of a subscriber class level, a sector number, and a mobile terminal ID.

23. The access point of claim 18 wherein the call admission policy:
blocks all new mobile terminals access if an average sector delay metric is above a first threshold;

blocks access to new mobile terminals of a second class if the average sector delay metric is below the first threshold and above a second threshold;

blocks access to new mobile terminals of the third class and a second class if the average sector delay metric is below the second threshold and above a third threshold; and grants all new mobile terminals access if the average sector delay metric is below the third threshold.

24. The access point of claim 23 wherein the call admission policy drops a mobile terminal if an individual average call delay is more than a delay QoS drop level.

25. The access point of claim 24 wherein calls are dropped in an order from a lowest class to a highest class.

26. The access point of claim 18 wherein the delay logic generates the call admission policy based on a delay bound metric wherein:

call admission is blocked if the individual average call delay is less than the delay bound metric; and call admission is granted if the individual average call delay is less than or equal to the delay bound metric.

27. The access point of claim 26 wherein the delay logic:

decreases the delay bound metric by a first factor if a sector packet drop rate is greater than a specified first percentage for a specified period of time;

increases the delay bound metric by a second factor if the sector packet drop rate is less than a specified second percentage for the specified period of time; and wherein the specified second percentage is less than the specified first percentage.

28. The access point of claim 17 wherein the call admission policy produces a switched call block metric that is less than a new call block metric.

* * * * *